United States Patent [19]
Anzai

[11] Patent Number: 5,157,417
[45] Date of Patent: Oct. 20, 1992

[54] PRINTING APPARATUS

[75] Inventor: Katsuhiko Anzai, Chiba, Japan

[73] Assignee: Canon Kabushiki Kaisha, Tokyo, Japan

[21] Appl. No.: 588,378

[22] Filed: Sep. 26, 1990

[30] Foreign Application Priority Data

Sep. 26, 1989 [JP] Japan .................................. 1-248066

[51] Int. Cl.⁵ .............................................. H04N 1/21
[52] U.S. Cl. ...................................... 346/108; 358/298
[58] Field of Search .................. 346/108, 107 R, 160; 358/298, 296, 300, 302; 364/519, 520

[56] References Cited

U.S. PATENT DOCUMENTS

| | | | |
|---|---|---|---|
| 4,816,924 | 3/1989 | Sekiya | 358/296 |
| 4,847,654 | 7/1989 | Honma et al. | 358/300 |
| 4,974,171 | 11/1990 | Yeh et al. | 364/519 |

*Primary Examiner*—Mark J. Reinhart
*Attorney, Agent, or Firm*—Fitzpatrick, Cella, Harper & Scinto

[57] ABSTRACT

A recording apparatus capable of changing print resolution, includes an input circuit for inputting recording data, and a processing circuit for processing the recording data input by the input circuit. The processing circuit can include a resolution information table for instructing set positions of each resolution for each line. A recorder records an image, which can have different resolutions on the same page, in accordance with the recording data processed by the processing circuit and the output of the resolution information table.

10 Claims, 8 Drawing Sheets

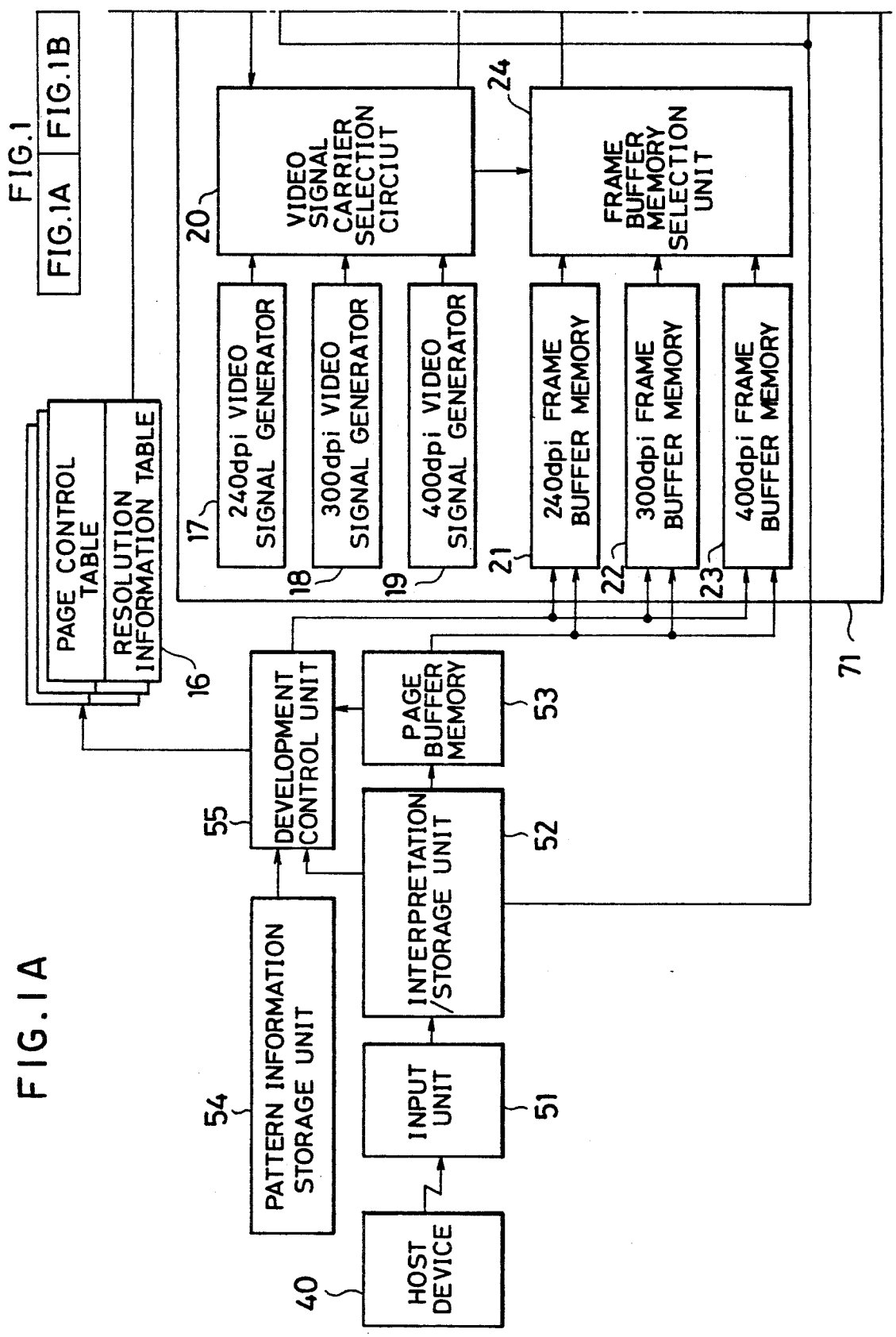

FIG.6

| FRAME | RESOLUTION | STARTING POINT | NUMBER OF LINES | WIDTH | LEADING ADDRESS |
|---|---|---|---|---|---|
| $f_1$ | 240 | $y_1$ | $l_1$ | $w_1$ | $p_1$ |
| $f_2$ | 400 | $y_2$ | $l_2$ | $w_2$ | $p_2$ |
| $f_3$ | 300 | $y_3$ | $l_3$ | $w_3$ | $p_3$ |
| 0 | 0 | 0 | 0 | 0 | 0 |

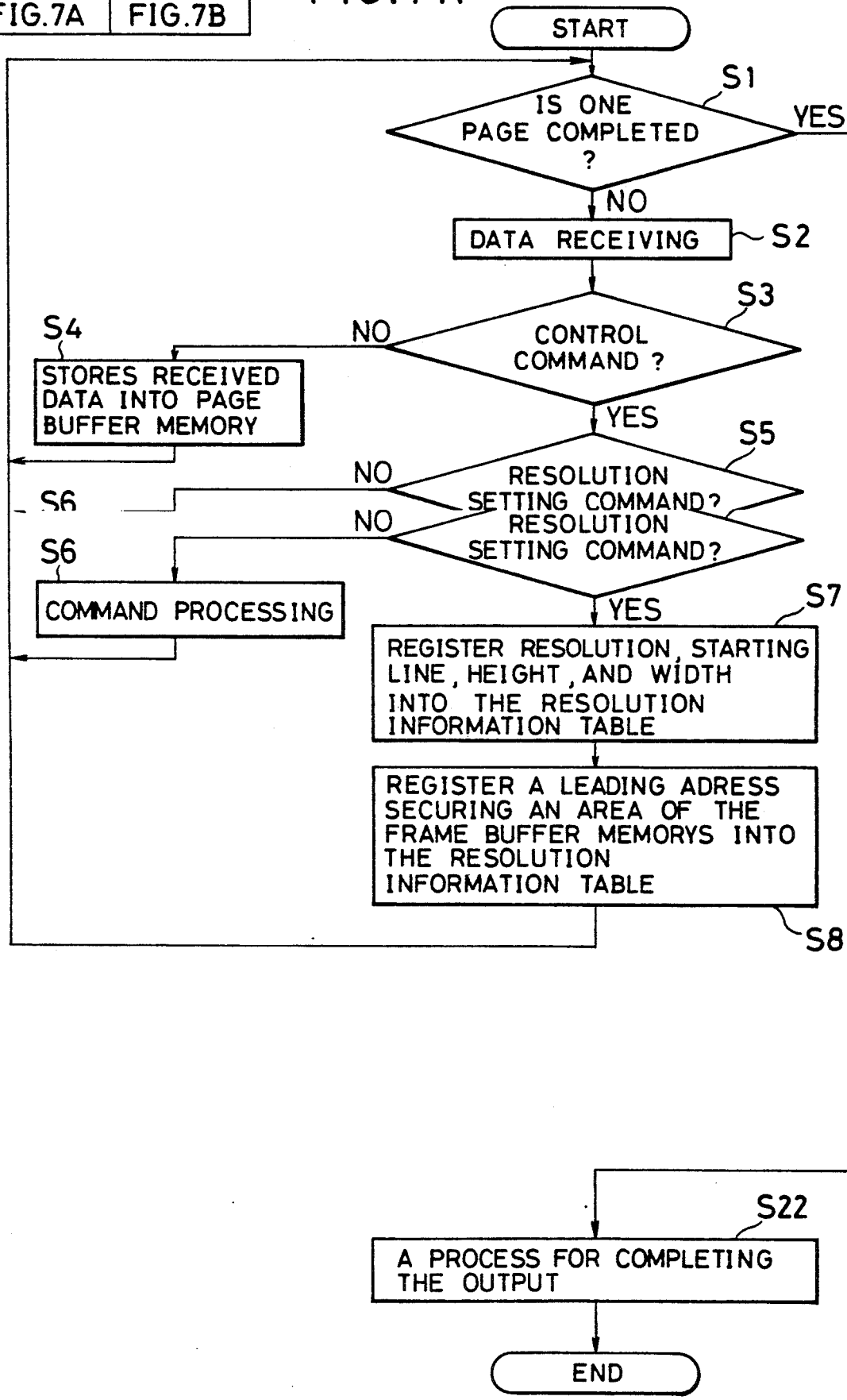

5,157,417

PRINTING APPARATUS

BACKGROUND OF THE INVENTION

1. Field of the Invention

This invention relates to a recording apparatus, and more specifically to a recording apparatus which can change resolution.

2. Related Background Art

FIG. 8 is a block diagram of a known printing apparatus. In the apparatus shown in FIG. 8, a host device 40 sends print data, etc., to a controller 50, which performs data processing on the print data sent from the host device 40 and outputs the processed data to a printer engine 60. The function of the printer engine 60 is to print out the print data received from the controller 50 with a designated format and resolution.

The controller 50 includes an input unit 51 for receiving the data from the host device 40, an interpretation/storage unit 52 for separating control commands from print data by analyzing the data sent from the host device 40 through the input unit 51, and a page buffer memory 53 for storing the print data. The controller 50 also includes a pattern information storage unit 54 for storing a printing pattern, such as a character pattern, corresponding to the print data, and a development control unit 55 for performing pattern development of the printing pattern from the pattern information storage unit 54 or of image pattern data from the page buffer memory 53 to a frame memory 56, which is also part of the controller 50. The controller 50 further includes an output control unit 57 for outputting image pattern data from the page buffer memory 53 or image data from the frame memory 56 to a printer engine control unit 61 in the printer engine 60.

In the known printing apparatus, data sent from the host device 40 is received by the input unit 51, and the interpretation/storage unit 52 analyzes whether the received data belongs to the category of control commands, or of print data. The print data is processed in a known fashion, and the processed print data is stored in the page buffer memory 53. The development control unit 55 reads out the print data stored in the page buffer memory 53 for conversion into a corresponding printing pattern by the pattern information storage unit 54, and development of the printing pattern in the frame memory 56.

Meanwhile, the page buffer memory 53 stores both print data for one page and control information relating to printing circumstances. The output control unit 57 sends the image data stored in the frame memory 56 to the printer engine 60 in accordance with the control information, and controls the printer engine 60 to print the image data out on a recording sheet.

In the known printing apparatus, printing resolution of the printer engine 60 based on the control by the output control unit 57 is fixed, generally at several hundreds of dpi (dots per inch).

In a known dot impact printer, a high-resolution image can be printed out by decreasing the rate of movement of the recording head, when image data is printed. However, in such a known dot impact printer, if such compressed printing is performed, the quality of the printed image is affected by superimposing of dots, because the size of the dots is constant. And in the case where a character pattern is printed, instead of the above-described manner of printing, only a printing at the resolution peculiar to the printer in question is executed.

A known PDL (page description language) or a known DTP (desk top publishing) system can execute a complex print processing with a high quality and in fact can be made to produce a combined image of text information and graphic images on the same page. Even in this case, the same resolution is employed for printing out both text and graphic portions, resulting in the defect that the quality of the graphic images deteriorates, although the quality of the characters or text is good.

Accordingly, in the known system, the resolution of the printing device employed in the system is increased to solve the above-described defect; specifically, the quality of all the printing is raised to correspond to what is needed for the graphic images. However, in the case where a high-resolution character pattern is provided for printing with graphic images, a large-capacity storage is required for storing the character pattern. Or, in a case where the character pattern is generated internally, much time is required for producing the character pattern from stored character information because of the high resolution of the character pattern, as a result of which a lowering of throughput cannot be avoided.

Further, a large-capacity RAM is required as the frame memory because the whole area of the printing image consits of a high-resolution image, which increases the cost of the system.

SUMMARY OF THE INVENTION

Accordingly, an object of the present invention is to provide a recording apparatus that can overcome the problems described above.

Another object of the present invention is to provide a recording apparatus that permits reproduction of images with high quality.

Still another object of the present invention is to provide a recording apparatus having a improved throughput.

It is still another object of the present invention to provide a recording apparatus having a good cost performance.

It is still another object of the present invention to provide a recording apparatus capable of varying the recording resolution according to necessity.

It is still another object of the present invention to provide a recording apparatus capable of selecting the recording resolution according to the output image.

In accordance with a perferred embodiment, the recording apparatus of the present invention includes an input circuit for inputting recording data. A processing circuit processes the recording dat input by the input circuit. The processing circuit includes a resolution information table for instructing set values of resolution for each line. A recorder then records an image, which can have different resolutions on the same page, in accordance with the recording data processed by the processing circuit and the output of the resolution information table.

In accordance with another aspect of the present invention, the recording apparatus includes an input circuit for inputting recording data. A processing circuit processes the recording data input from the input circuit. The processing circuit includes a developing circuit for developing the recording data and outputting an image pattern, and a memory for storing the image pattern for each of several available resolutions. A recorder then records an image, which can have different resolutions on the same page, in accordance with the image pattern.

Other objects, features and advantages of the invention will become apparent from the following detailed description of the preferred embodiments of the present invention and the accompanying drawings.

BRIEF DESCRIPTION OF THE DRAWINGS

FIGS. 1, 1A and 1B are block diagrams of the first perferred embodiment of this invention;

FIG. 6 is an illustration showing a structure of a resolution information table in a case where the resolution designation shown in FIG. 5 has been done;

FIGS. 7, 7A and 7B are a flow chart of a printing output control having a resolution changing processing.

DETAILED DESCRIPTION OF THE PREFERRED EMBODIMENTS

The preferred embodiments of the present invention will be described in detail herein with reference to the accompanying drawings.

Figure 1B:
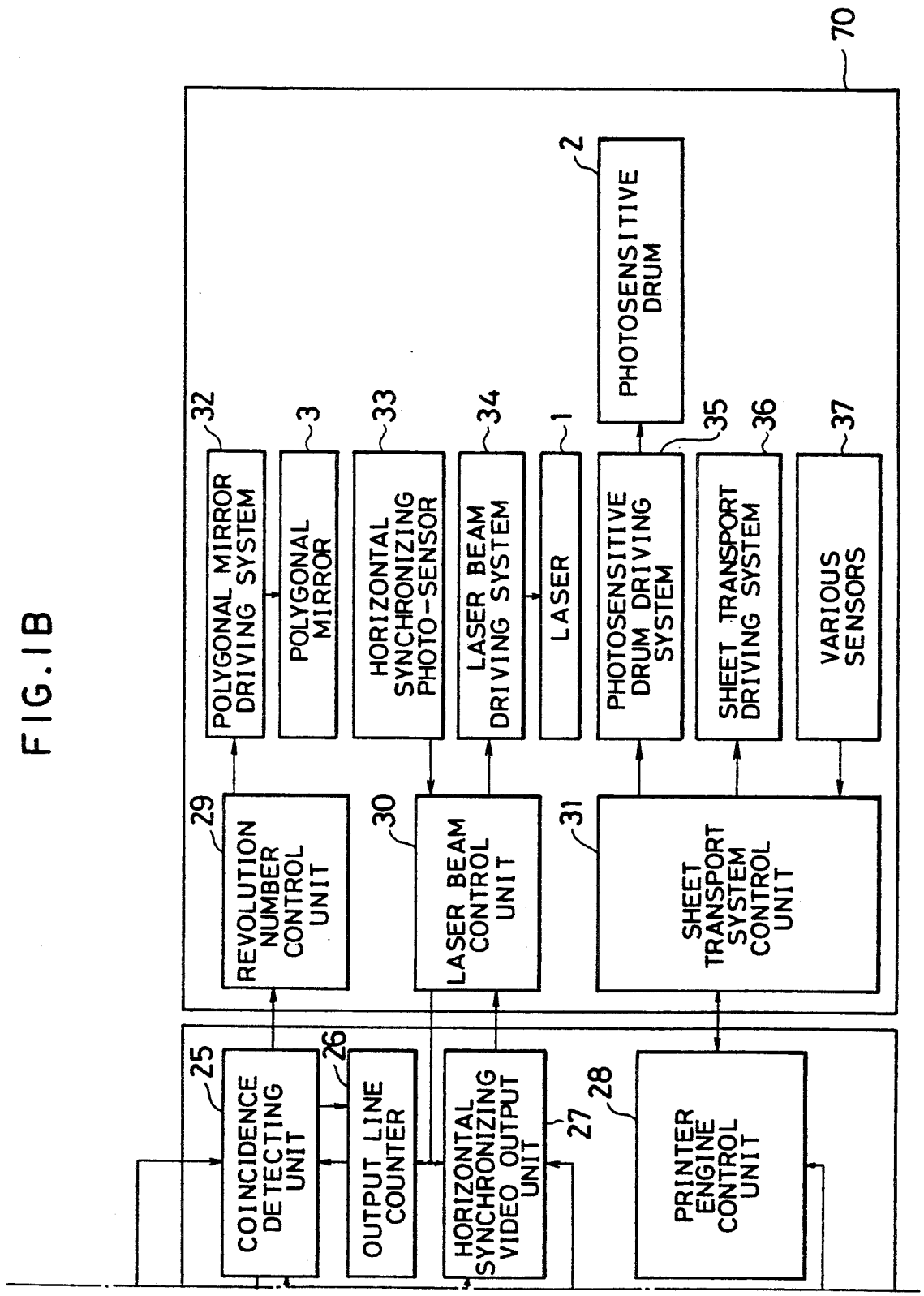
Figure 8:
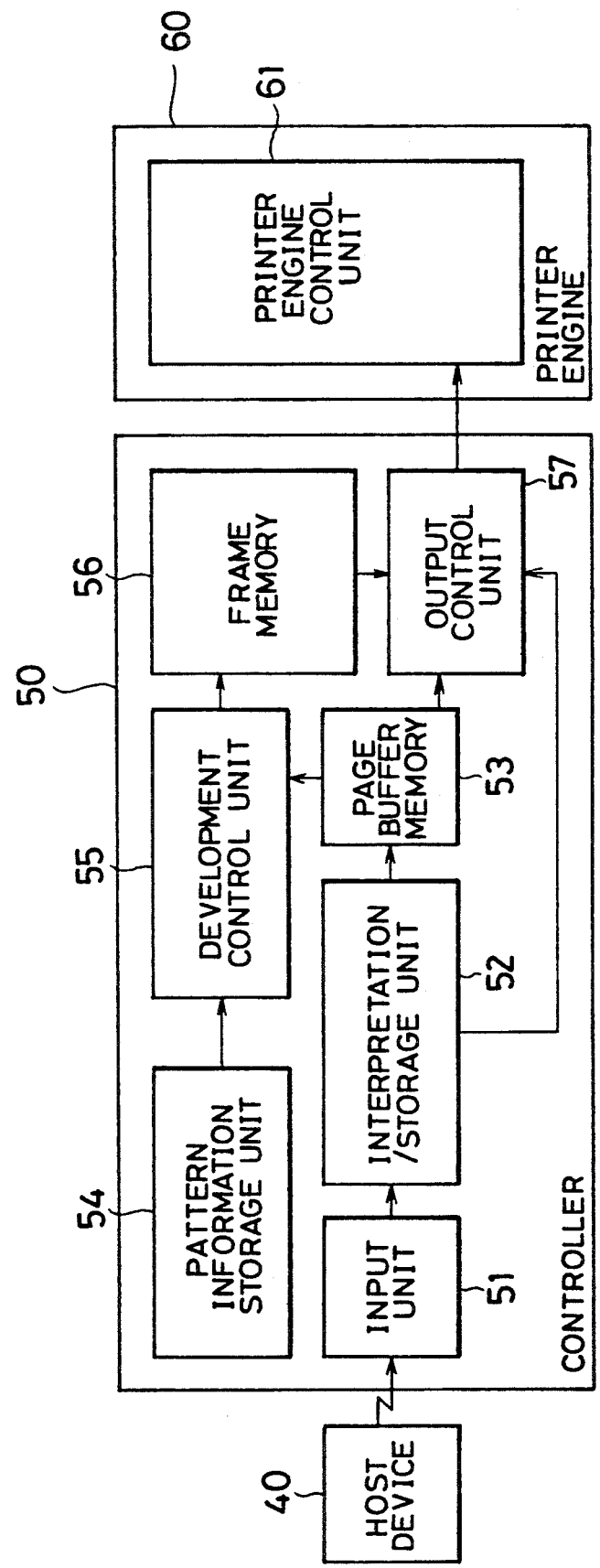
FIG. 8 is a block diagram showing a known printing apparatus.

FIG. 1 is a block diagram of a recording system according to the first embodiment of the present invention. In FIG. 1, the same reference numerals are used to denote elements like or corresponding to those explained in connection with FIG. 8. The circuit shown in FIG. 1 has a structure that can change resolutions on the same page by improving the frame memory 56, output control unit 57 and printer engine 60 shown in FIG. 8.

The circuit in FIG. 1 includes a page control/resolution information table 16 for registering a resolution set area (an area throughout which the resolution has the same value) and set resolution information designated by the host device 40, a 240 dpi video signal generator 17, a 300 dpi video signal generator 18 and a 400 dpi video signal generator 19 for generating a video signal in the cases of 240, 300 and 400 dpi resolution, respectively. A video signal carrier selection circuit 20 is provided for selecting one of the video signal generators 17-19 in accordance with designated resolution information, and for outputting the selected video signal to a horizontal synchronizing video output unit 27.

The circuit also includes a 240 dpi frame buffer memory 21, a 300 dpi frame buffer memory 22, and a 400 dpi frame buffer memory 23 for storing a print data pattern having 240, 300 or 400 dpi resolution, respectively. A frame buffer memory selecting unit 24 is provided for selecting one of the frame buffer memories 21-23 in accordance with the designated resolution information, and for outputting the print data pattern from the selected frame buffer memory to the horizontal synchronizing video output unit 27.

A coincidence detecting unit 25 is provided for detecting a coincidence between a printing position of a printer engine 70 and the resolution set area of the page control/resolution information table 16. The coincidence detecting unit 25 designates the video signal carrier selection circuit 20 and, via circuit 20, the frame buffer memory selection unit 24 to select the appropriate ones of video signal generators 17-19 and of frame buffer memories 21-23 in accordance with the set resolution information registered with the page control/resolution information table 16. At the same time, a revolution number control unit 29 is controlled by the coincidence detecting unit 25 to match the number of revolutions per unit time of a polygonal mirror 3 to the set resolution.

An output line counter 26 is provided for counting the line number bening printed out. The horizontal synchronizing video output unit 27 is provided for modulating a print data signal sent from the frame buffer memory selection unit 24 with a video signal carrier sent from the video signal carrier selection circuit 20, and for outputting the modulated print data signal to a laser beam control unit 30 as a video signal.

The circuit also includes a printer engine control unit 28 for controlling a printer engine 70, the revolution number control unit 29 for controlling the revolution rate of the polygonal mirror 3, the laser beam control unit 30 for controlling the emission of a laser 1 in accordance with the video signal sent from the horizontal synchronizing video output unit 27 and in synchronism with a detection signal from a horizontal synchronizing photosensor 33, and a sheet transport system control unit 31 for controlling a sheet transport system and a photosensitive drum 2.

A polygonal mirror driving system 32 for driving the polygonal mirror 3 is also provided, as are the horizontal synchronizing photo-sensor 33 for producing a horizontal synchronizing signal, and laser beam driving system 34 for controlling the emission of the laser 1.

The circuit further includes a photosensitive drum driving system 35 for rotating the photosensitive drum 2, a sheet transport driving system 36 for transporting a recording sheet, and various sensors 37 for detecting various conditions such as a transport condition of a recording sheet in each position of a sheet transport system.

Figure 2:
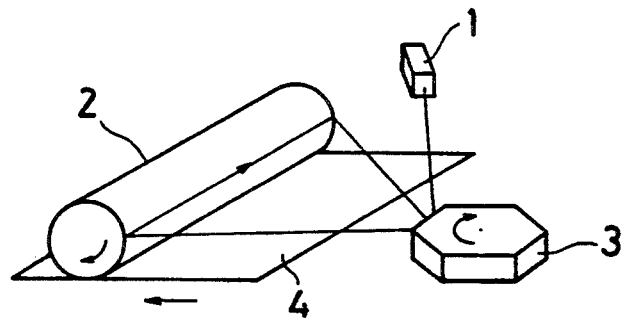
FIG. 2 is a schematic illustration of a printer engine unit according to the first embodiment.

FIG. 2 is a schematic perspective view of a scanning system, specifically, an irradiation system for directing a light beam from the laser 1 onto the photosensitive drum 2 to irradiate the latter, in the above-described structure. As shown in FIG. 2, the system includes laser 1 (generating source of the laser beam), the photosensitive drum 2 for transferring an image onto a recording sheet 4, and the polygonal mirror 3 for scanning the photosensitive drum 2 by the laser beam from the laser 1.

Figure 3:
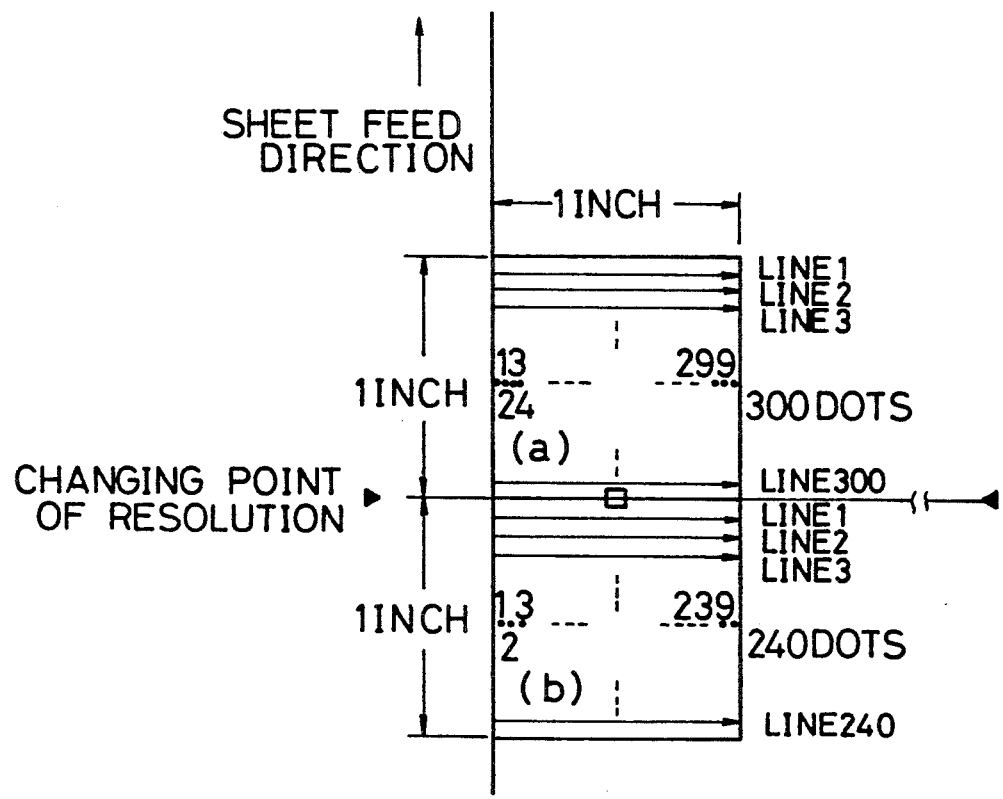
FIG. 3 is an illustration of a print showing a resolution conversion according to the first embodiment.

FIG. 3 is a typical illustration showing a state of resolution conversion according to the embodiment of FIG. 1. FIG. 3 shows an example of a change of resolution on a single recording sheet, such as a change of resolution from 300 dpi (region (a)) to 240 dpi (region (b)) at a point "Δ", which is shown in FIG. 3 but is not physically marked on the recording sheet.

Figure 4A:
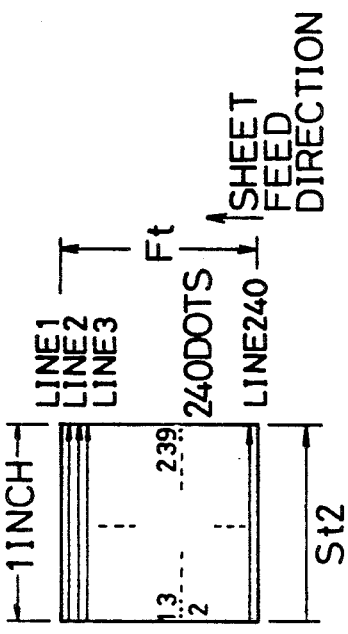
FIG. 4A and FIG. 4B are illustrations for explaining resolution control according to the first embodiment.
Figure 4B:
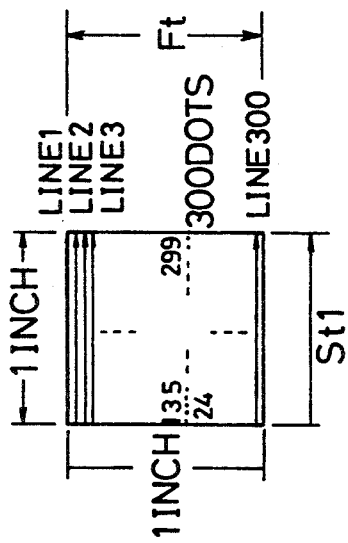

FIG. 4A and FIG. 4B show regions (a) and (b), respectively, shown in FIG. 3. FIG. 4A shows an extraction of one inch of region (a), above the "Δ", and denotes a resolution of 300 dpi. FIG. 4B shows an extraction of one inch of region (b), below the point "Δ", and denotes a resolution of 240 dpi.

In FIG. 4A and FIG. 4B, $F_t$ denotes an elapsed time for feeding the recording sheet one inch, and $S_{t1}$, $S_{t2}$ denote elapsed times for scanning the photosensitive drum 2 one inch with the laser beam at the two resolutions 300 dpi and 240 dpi, respectively.

In the case where the resolution is 300 dpi as shown in FIG. 4A, three hundred laser scanning lines are required within the time $F_t$, and the polygonal mirror 3 must make fifty rotations within the time $F_t$, if the polygonal mirror 3 has six surfaces. In this case, a video signal having a frequency that can switch the laser beam three hundred times within the time $S_{t1}$ is further required for producing three hundred dots using the laser beam within the time $S_{t1}$, during which time the photosensitive drum 2 is scanned one inch.

Similarly, in the case where the resolution is 240 dpi as shown in FIG. 4B, two hundred and forty laser scanning lines are required within the time $F_t$, and the six-sided polygonal mirror 3 must make forty rotations within the time $F_t$. In this case, a video signal having a frequency that can switch the laser beam two hundred and forty times within the time $S_{t2}$ is required.

The polygonal mirror driving system 32 includes a control circuit that can set and hold an arbitrary number of rotations of the polygonal mirror 3, by a known method. A controller 71 for controlling the printer engine 70 includes a means for changing the frequency of the video signal. The recording resolution can be changed by controlling the latter means and the control circuit.

In this embodiment, three dispersed frequencies, which are calculated for corresponding to the three resolutions, i.e., 240 dpi, 300 dpi and 400 dpi, are used selectively for sending the video signal of the controller 71, instead of successive frequencies.

On the other hand, the polygonal mirror driving system 32 includes the control circuit for supporting the three kinds of resolutions, and the control circuit can set and hold the rate rotation of the polygonal mirror 3 according to an instruction from the controller 71.

Explanations of a method for designating a resolution and of a method for holding resolution information will be described below with reference to FIG. 5 and FIG. 6.

Figure 5:
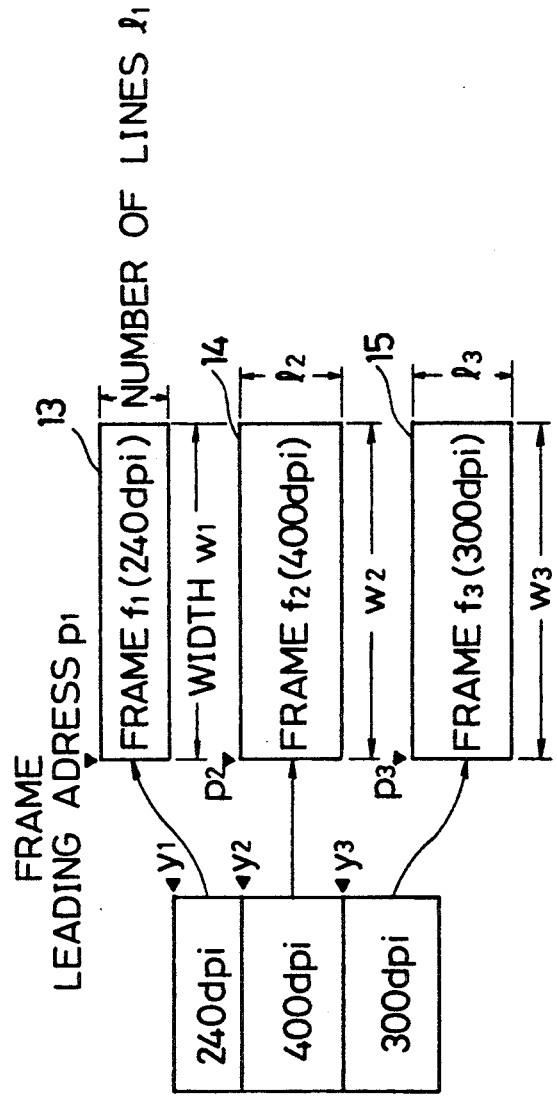
FIG. 5 is an illustration showing divided areas having different resolutions on the same page and structures of frame memories corresponding to the different resolutions.

The left-hand part of FIG. 5 is an illustration of a print output having three resolutions, i.e., 240 dpi, 400 dpi and 300 dpi, on the same page. A change in resolution on the same page is performed by designating the resolution, position and size of the respective printing areas which are to differ in resolution, using control commands sent from the host device 40. In FIG. 5, the frame of the print out is divided into several portions in such a way that a portion from a point $Y_1$ to just before a point $Y_2$ corresponds to 240 dpi, a portion form point $y_2$ to just before a point $y_3$ corresponds to 400 dpi, and a portion from point $y_3$ to the page end corresponds to 300 dpi.

The interpretation/storage unit 52 draws up the resolution information table as shown in FIG. 6 at the time of execution of a command for resolution setting, issued by the host device 40. The interpretation/storage unit 52 has a function for securing the frames divided or defined by the execution of the command. That is, resolution-changing-area information specified for each page as shown in FIG. 6 is stored and registered in the resolution information table by the interpretation/storage unit 52. The print data patterns to be printed out, sent from the page buffer memory 53 and the development control unit 55, are developed and stored in each frame buffer memory. That is, print data patterns corresponding respectively to frame 1, frame 2, and frame 3 are developed and stored in the 240 dpi frame buffer memory, the 400 dpi frame buffer memory, and the 300 dpi frame buffer memory, respectively.

Figure 7B:
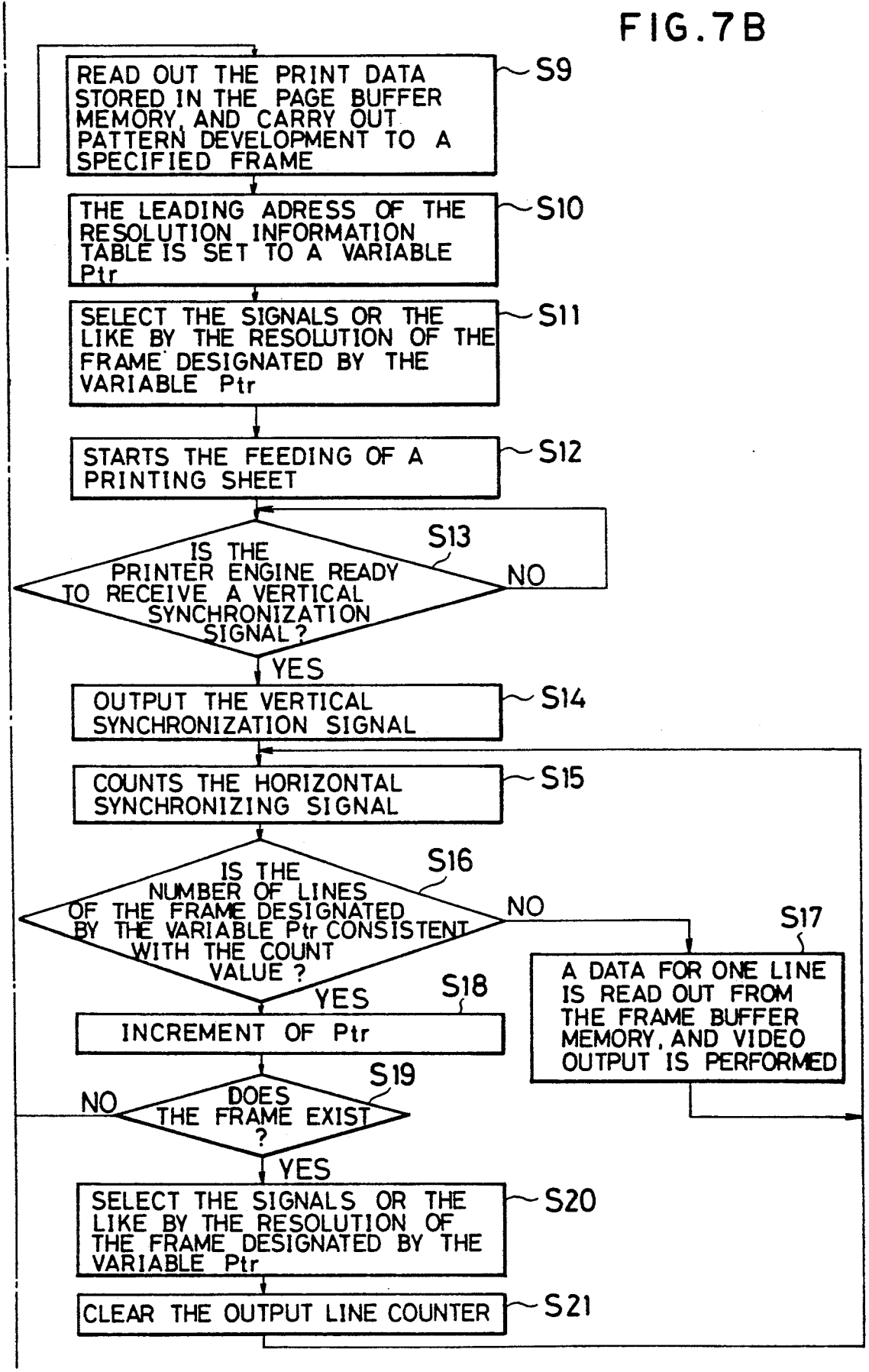

Resolution changing control according to this embodiment are described below with reference to a flowchart shown in FIG. 7.

In step S1, the program stored in the circuit checks whether a page being drawn up in the page buffer memory S3 has been completed or not. If the page is not complete, the flow advances to step S2 to receive data. In step S3, it is determined whether the received data is a control command or not. If the received data is not a control command, i.e., the received data is regular print data, the flow advances to step S4, where the received data is stored in the page buffer memory S3, and the flow returns to step S1.

On the other hand, if the received data is a control command, the flow advances to step S5 from step S3. In step S5, the program checks whether the control command is a resolution setting command or not. If the control command is an another control command, processing corresponding to the received control command is performed, and the flow returns to step S1. But if the received control command is a resolution setting command, the flow advances to step S7 from step S5. In step S2, a designated resolution, starting line, number of lines, and the like are registered in the resolution information table, for instance, as shown in FIG. 6. In step S8, a leading address securing an area of the frame buffer memories 21-23 is registered in the resolution information table based on the registered information, and the flow returns to step S1.

If, in step S1, the drawing of the one page in the page buffer memory S3 is complete, the flow advances to step S9 from step S1. In step S9 the print data stored in the page buffer memory S3 is read out, and pattern development processing, such as pattern drawing, is carried out on a specified frame of the frame buffer memories 21-23 in accordance with the read-out print data. In step S10, the leading address of the resolution information table 16 is set to a variable $P_{tr}$ of pointer form. In step S11, the program instructs the revolution number control unit 29 of the printer engine 70 to set a revolution number of the polygonal mirror 3 to correspond appropriately to the resolution of the frame designated by the variable $P_{tr}$. The program further instructs the video signal carrier selection circuit 20 of the controller 71 to select one of the video signal generators 17-19, and instructs the frame buffer memory selection unit 24 to select one of the frame buffer memories 21-23. In step S12, the printer engine control unit 28 instructs the sheet transport system control unit 31 to start the feeding of a printing sheet. Then, in step S13, the printing sheet is fed, and the program waits until the printer engine 70 is ready to receive a vertical synchronization signal.

When the printer engine 70 is ready to receive the vertical synchronization signal, the flow advances to step S14 from step S13. In step S14, the vertical synchronization signal is output. In step S15, the output line counter 26 counts up by one count in response to receiving the horizontal synchronizing signal detected by the horizontal synchronizing photosensor 33 in the printer engine 70. In step S16, the program checks whether the number of lines of the frame designated by the variable $P_{tr}$ is consistent with the count value of the output line counter 26. If the number of lines of the frame is not consistent with the count value, the flow advances to step S17, where new data for one line is read out from the frame buffer memory corresponding to the designated frame, and is carried on the video signal carrier corresponding to the designated frame. In this way, the new data is output to the horizontal synchronizing video output unit 27 as a video signal, and the flow returns to step S15.

On the other hand, if the number of lines of the frame is consistent with the count value in step S16, the flow advances to step S18, where the value of the variable $P_{tr}$ is increased to allow the information of the next frame to be taken out. In step S19, the program checks whether the frame designated by the variable $P_{tr}$ exists or not. If it does, the flow advances to step S20, where the video signal carrier selection circuit 20, the frame buffer memory selection unit 24, and the revolution number control unit 29 perform selection control similar to that of step S11, as appropriate for the new frame (new resolution). In step S21, the output line counter 26 is cleared, and the flow returns to step S15.

When in step S19 the answer is no, the flow advances to step S22 where a process for completing the output is performed whereby a series of printing process is completed.

According to the above-described processing, it is possible to mix several different resolutions on one page, and even on one line, and to print the page out.

In the above-described embodiment, the revolution number control unit 29 of the printer engine 70 changes the revolution rate of the polygonal mirror 3 in accordance with an instruction from the controller 71. However, it takes time for the revolution number of the polygonal mirror 3 to reach a new predetermined revolution rate when the rate is changed. As a result, there is a possibility that the first line just after a change in the resolution (or the revolution rate of the polygonal mirror 3) may be affected in the case of rapid printing.

As a method for preventing this draw-back, it is possible to provide another page control/resolution information table controlled by the revolution number control unit 29 of the printer engine 70 while putting the page control/resolution information table 16 at the controller 71. Then, the contents of the page control/resolution information table 16 may be registered in the other page control/resolution information table disposed at the revolution number control unit 29 before initiating a printing operation. In this case, circuits like the coincidence detecting unit 25 and the output line counter 26 should be provided in the printer engine 70, so that resolution discrimination at high speed and changing of the revolution rate of the polygonal mirror 3 can be performed independently. In this manner, it is possible to reduce the above-mentioned drawback by adding the above-described structure.

As a further method for preventing the above-described drawback, it is also possible to await the initiation of the printing for a certain while, by controlling the sheet transport driving system 36 and the photosensitive drum driving system 35 until the revolution rate of the polygonal mirror 3 reaches a designated value, in the case of changing of the revolution rate.

As mentioned above, with these embodiments, it is possible to combine plural resolutions on the same page and to print the page out. Thus, partial high-resolution printing can be performed while preventing high cost.

Further, in the case where graphic data or image data is combined with text data, there is the advantage that both types of data can be reproduced with high quality.

As mentioned above, according to the present invention, it is possible to print out an image having plural kinds of print data, to which the proper resolutions are assigned, with high quality at high speed.

Although the preferred particular embodiments of the present invention are disclosed herein for purposes of explanation, various modifications thereof, after study of this specification, will be apparent to those skilled in the art to which the invention pertains.

What is claimed is:

1. A recording apparatus comprising:
   input means for inputting recording data and command data for controlling recording operations; and
   processing means for processing the recording data input by said input means, wherein said processing means further comprises:
      a resolution information table for storing resolution data indicating a plurality of recording resolutions on the same page and region data indicating a region in which recording for each resolution is performed in accordance with command data input by said input means,
      a plurality of buffer memories each corresponding to a respective resolution for storing recording data corresponding to its respective resolution, and
      recording means for recording an image having different resolutions on the same page in accordance with the recording data stored in said plurality of buffer memories and data stored in said resolution information table.

2. A recording apparatus according to claim 1, wherein said processing means further comprises developing means for developing recording data input by said input means and outputting a developed image pattern, said buffer memories storing the developed image pattern.

3. A recording apparatus according to claim 2, wherein said processing means further comprises a carrier signal generator for generating carrier signals for sending the image pattern to the recording means, and wherein each of said carrier signals corresponds to a respective resolution, and said carrier signal generator changes carrier signal in accordance with resolution.

4. A recording apparatus according to claim 1, wherein said recording means changes operation mode in accordance with the set positions of each resolution.

5. A recording apparatus according to claim 4, wherein said recording means further comprises laser beam generating means for generating a laser beam, a polygonal mirror for scanning the laser beam, and polygonal mirror drive means for controlling a rotation speed of said polygonal mirror in accordance with a selected resolution.

6. A recording apparatus comprising:
   input means for inputting recording data and resolution data;
   a buffer memory for storing recording data input by said input means; and
   a processing means for processing the recording data stored in said buffer memory, wherein said processing means further comprises:
      developing means for developing recording data stored in said buffer memory in accordance with said resolution data and outputting a developed image pattern, memory means for storing the developed image pattern corresponding to each of resolutions output by said developing means, said memory means comprising storage areas corresponding respectively to each resolution, and recording means for recording an image having different resolutions on the same page in accordance with the image pattern stored in said memory means of said processing means.

7. A recording apparatus according to claim 6, wherein said processing means further comprises a resolution information table for instructing set positions of each resolution.

8. A recording apparatus according to claim 7, wherein said processing means further comprises a carrier signal generator for generating carrier signals for sending the image pattern to the recording means, and wherein each of said carrier signals corresponds to a respective resolution, and said carrier signal generator changes carrier signal in accordance with resolution.

9. A recording apparatus according to claim 8, wherein said recording means changes operation mode in accordance with the set positions of each resolution.

10. A recording apparatus according to claim 9, wherein said recording means further comprises laser beam generating means for generating a laser beam, a polygonal mirror for scanning the laser beam, and polygonal mirror drive means for controlling a rotation speed of said polygonal mirror in accordance with a selected resolution.

* * * * *